(12) United States Patent
Chang

(10) Patent No.: US 8,832,347 B2
(45) Date of Patent: Sep. 9, 2014

(54) AUTOMATIC DETECTION DEVICE, SYSTEM AND METHOD FOR INTER-INTEGRATED CIRCUIT AND SERIAL GENERAL PURPOSE INPUT/OUTPUT

(75) Inventor: Po-Chung Chang, Taipei (TW)

(73) Assignee: inventec Corporation, Taipei (TW)

( * ) Notice: Subject to any disclaimer, the term of this patent is extended or adjusted under 35 U.S.C. 154(b) by 288 days.

(21) Appl. No.: 13/343,295

(22) Filed: Jan. 4, 2012

(65) Prior Publication Data

US 2012/0324131 A1 Dec. 20, 2012

(30) Foreign Application Priority Data

Jun. 15, 2011 (TW) .............................. 100120905 A

(51) Int. Cl.
*G06F 13/36* (2006.01)
*G06F 13/42* (2006.01)

(52) U.S. Cl.
CPC ...................................... *G06F 13/42* (2013.01)
USPC ........................................................ 710/306

(58) Field of Classification Search
USPC ........................................................ 710/306
See application file for complete search history.

(56) References Cited

U.S. PATENT DOCUMENTS

| 6,038,400 | A  | * | 3/2000  | Bell et al. ........................ 710/11 |
| 6,691,201 | B1 | * | 2/2004  | Williams et al. .............. 710/315 |
| 7,454,530 | B2 | * | 11/2008 | Cahill et al. ...................... 710/8 |
| 7,613,843 | B1 | * | 11/2009 | Dhandapani et al. ............. 710/8 |
| 7,734,839 | B1 |   | 6/2010  | Sivertsen |
| 2003/0229748 | A1 | * | 12/2003 | Brewer et al. ................. 710/305 |
| 2005/0030801 | A1 | * | 2/2005  | Perroni et al. ................. 365/200 |
| 2008/0005424 | A1 | * | 1/2008  | Raines ............................ 710/62 |
| 2009/0070504 | A1 | * | 3/2009  | Kostadinov ................... 710/105 |
| 2010/0191870 | A1 | * | 7/2010  | Qi et al. .......................... 710/11 |
| 2011/0125941 | A1 | * | 5/2011  | Sivertsen ...................... 710/105 |

* cited by examiner

*Primary Examiner* — Nimesh G Patel
(74) *Attorney, Agent, or Firm* — Huffman Law Group, PC

(57) ABSTRACT

An automatic serial signal detecting and transceiving device and related system and method are provided for detecting whether a connected initiator unit is using an inter-integrated circuit ($I^2C$) interface protocol or a serial general purpose input/output (SGPIO) interface protocol. The device includes an input interface, connected to the initiator unit, and a control unit. A load pin of the input interface services either the SLoad signal line of an SGPIO bus, or the Reset signal line of an $I^2C$ bus. As the device is connected to different initiators, the control unit monitors the load pin for a trigger signal, thereby automatically detecting the interface protocol in use, and processes and transceives data in accordance with the detected interface protocol. The control unit also controls a light-emitting diode (LED) based on the detected interface protocol and data transmitted in accordance with the detected interface protocol.

17 Claims, 4 Drawing Sheets

AUTOMATIC DETECTION DEVICE, SYSTEM AND METHOD FOR INTER-INTEGRATED CIRCUIT AND SERIAL GENERAL PURPOSE INPUT/OUTPUT

CROSS-REFERENCE TO RELATED APPLICATIONS

This non-provisional application claims priority under 35 U.S.C. §119(a) on Patent Application No(s). 100120905 filed in Taiwan, R.O.C. on Jun. 15, 2011, the entire contents of which are hereby incorporated by reference.

BACKGROUND

1. Technical Field

The technical field relates generally to serial data transfer protocols, and more particularly to a device and method for detecting whether a connected device is using an inter-integrated circuit ($I^2C$) interface protocol or a serial general purpose input/output (SGPIO) interface protocol.

2. Related Art

As a consequence of the miniaturization of integrated circuits, the data transfer speed and capacity of storage equipment has grown significantly. To enable faster transfer of data between storage devices, new sequencing technology has replaced the conventional Small Computer Small Interface (SCSI) and Advanced Technology Attachment (ATA) hard drive parallel connection technologies. These new technologies include Serial Attached SCSI (SAS) and Serial ATA (SATA), which have succeeded and replaced SCSI and ATA, respectively.

Typically, LEDs are employed to display the operational status of connected SAS and SATA devices. For example, it is common to use at least one LED to represent drive activity. It is also common to use additional LEDs to indicate locate and error conditions. To communicate this information along with other data, manufacturers usually use either an SGPIO interface protocol or an $I^2C$ interface protocol. In either case, the interface protocol specifies how data is transferred between an initiator unit or device 110 (such as a host bus adapter) and a target unit or device 120 (such as a backplane holding disk drives).

The $I^2C$ interface protocol is described in NXP Semiconductor's UM10204 I2C-bus specification and user manual (Rev. 03-19 Jun. 2007), which is publicly available on the Internet and which document is herein incorporated by reference for all purposes. The $I^2C$ interface protocol uses two lines of bi-directional open drain serial data (SDA) and serial clock (SCL) for transmitting a control signal and uses a resistor to pull an electrical potential to trigger the signal. The $I^2C$ interface protocol allows wide working voltage range, but the typical voltage level is +3.3 V or +5 V. A reference design of the $I^2C$ interface protocol uses an address space of 7-bit length but reserves 16 addresses, so one set of buses may be communicated with 112 nodes at most. The common $I^2C$ bus has different modes comprising a standard mode (100 Kbit/s) and a low speed mode (10 Kbit/s) in accordance with different transfer speeds.

The SGPIO interface protocol is described in the SFF Committee's SFF-8485 Specification for the Serial GPIO (SGPIO) Bus. Revision 0.7, dated 1 Feb. 2006, of this specification, which is publicly available on the Internet, is hereby incorporated by reference for all purposes. FIG. 1 is a schematic view of pins of an SGPIO in the conventional art. The SGPIO in the conventional art has four signal lines comprising SClock, SLoad, SDataOut, and SDataIn. The first three signal lines transfer signals from an initiator 110 to a target 120. The last signal line transfer signals from the target 120 to the initiator 110. The SClock is configured to define a transfer clock of the SGIPO. The SLoad is synchronized to the clock and is used to indicate the start of a new frame of data to be transferred. The new frame is at least 5 clock cycles after the SLoad, and is triggered on the rising edge of the clock waveform. The SDataOut is the serial data output bit stream, and the SDataIn is the serial data input bit stream. Generally speaking, the SDataIn is not supported by all the SGPIO equipments, so the signal line of the SDataIn is optional.

If a redundant array of independent disk (RAID) supports the SGPIO, the interface protocol exactly comprises an SGPIO signal interface in addition to the data transfer interface, and can realize the data transfer and the control of indicators by a signal line comprising the data and SGPIO. SAS over $I^2C$ is managed by a special line of the $I^2C$ interface on the RAID card, which may be referred to as out-of-band management. For the SGPIO, this may be referred to as in-band management. Besides the RAID card supports the SGPIO, the disk backplane is required to support the SGPIO.

To provide for either SGPIO or $I^2C$ transfer using the same hardware, the conventional art provides a jumper or a method of hardware detection. The jumper setup comprises having a user set a jumper before connecting the target 120 to the initiator 110, so as to select between different interface protocols. Although this setup is low cost, resetting of the jumper is required every time the hardware is replaced. If the user forgets to set the jumper properly, the initiator 110 and the target 120 cannot function normally.

A conventional hardware detection setup, which provides for detection of a signal transferred by the initiator unit 110, requires a correspondence of SGPIO and $I^2C$ pins as shown in Table 1 below.

TABLE 1

Correspondence Table of Pins of SGPIO and $I^2C$ in the Conventional Art

| SEQUENCE OF PINS | PIN FUNCTION OF SGPIO | PIN FUNCTION OF $I^2C$ |
| --- | --- | --- |
| 0 | SCLK | Clock (2W_SCLK) |
| 1 | SLoad | DataOutput (2W_SDA) |
| 2 | Grounding | Grounding |
| 3 | Grounding | Grounding |
| 4 | SDataOut | Reset |
| 5 | SDataIn | NIL |

In this setup, six signal lines are required for driving the SGPIO and the $I^2C$ busses. Although this method can achieve quick detection and switch, it requires additional detection chips. Moreover, the hardware must fit the layout of signal lines of the SGPIO and the $I^2C$. The hardware setup costs significantly more than the jumper setup.

SUMMARY

In one embodiment, an automatic serial signal detecting and transceiving device is provided. The automatic serial signal detecting and transceiving device includes an input interface having dual-purpose pins operable to be interfaced with either an $I^2C$ or an SGPIO bus, and operable to automatically detect whether a connected initiator is using an $I^2C$ interface protocol or an SGPIO interface protocol to communicate.

The automatic serial signal detecting and transceiving device comprises an input interface and a control unit. The input interface is configured for connection to an initiator. The input interface comprises load, CLK, DataOut, and DataIn pins electrically connected to the communications bus, whether it be an I²C bus or an SGPIO bus. The pins are sequentially arranged so that if the communications bus is an SGPIO bus, then the load pin is connected to the SLoad signal line of the initiator, and if the communications bus is an I²C bus, then the load pin is connected to a Reset signal line of the initiator. Also, the DataOut pin is connected either to the SDataOut signal line, if the initiator is communicating via SGPIO, or the SDA line, if the initiator is communicating via I²C. The control unit is connected to an input interface, and configured to detect which of the I²C and SGPIO interface protocols a connected initiator is using according to a trigger signal (SLoad for SGPIO) received by the load pin. The control unit is further configured to transceive a data signal of the initiator according to the detected interface protocol.

In another embodiment, a method is provided for using a common physical serial data interface to connect to either an I²C or an SGPIO bus, which comprises the following steps. The automatic serial signal detecting and transceiving device is electrically connected between an initiator and a target using an I²C or SGPIO bus, wherein a load pin of the automatic serial signal detecting and transceiving device is electrically connected to an SLoad signal line or a Reset signal line of the initiator, depending on the interface protocol being used. The automatic serial signal detecting and transceiving device detects the interface protocol of the initiator according to a trigger signal (SLoad for SGPIO) received by the load pin. A data signal of the initiator is transceived according to the detected interface protocol.

In addition to the above embodiments, the disclosure further provides a system for automatically detecting which of an I²C and an SGPIO interface protocol a connected device is using. The system comprises an initiator, a target and an automatic serial signal detecting and transceiving device. The initiator is configured to send a data signal in accordance with either the I²C or the SGPIO interface protocol. The target accesses and receives the data signal. The automatic serial signal detecting and transceiving device is electrically connected between the initiator and the target. The automatic serial signal detecting and transceiving device further comprises an input interface and a control unit. The input interface is electrically connected to the initiator. A load pin of the input interface is electrically connected to an SLoad signal line or a Reset signal line of the initiator. The control unit is electrically connected to the input interface. The control unit detects the interface protocol used by the initiator according to a trigger signal (SLoad for SGPIO) received by the load pin. The control unit transceives a data signal of the initiator according to the detected interface protocol.

In the automatic serial signal detecting and transceiving device for connection with both I²C and SGPIO initiators, the automatic switching to the corresponding interface protocol is realized when testing different motherboards on production lines, thereby accelerating the relevant test of the data transfer of the target.

BRIEF DESCRIPTION OF THE DRAWINGS

The disclosure will become more fully understood from the detailed description given herein below for illustration only, and thus are not limitative of the disclosure, and wherein.

DETAILED DESCRIPTION OF THE INVENTION

Figure 1:
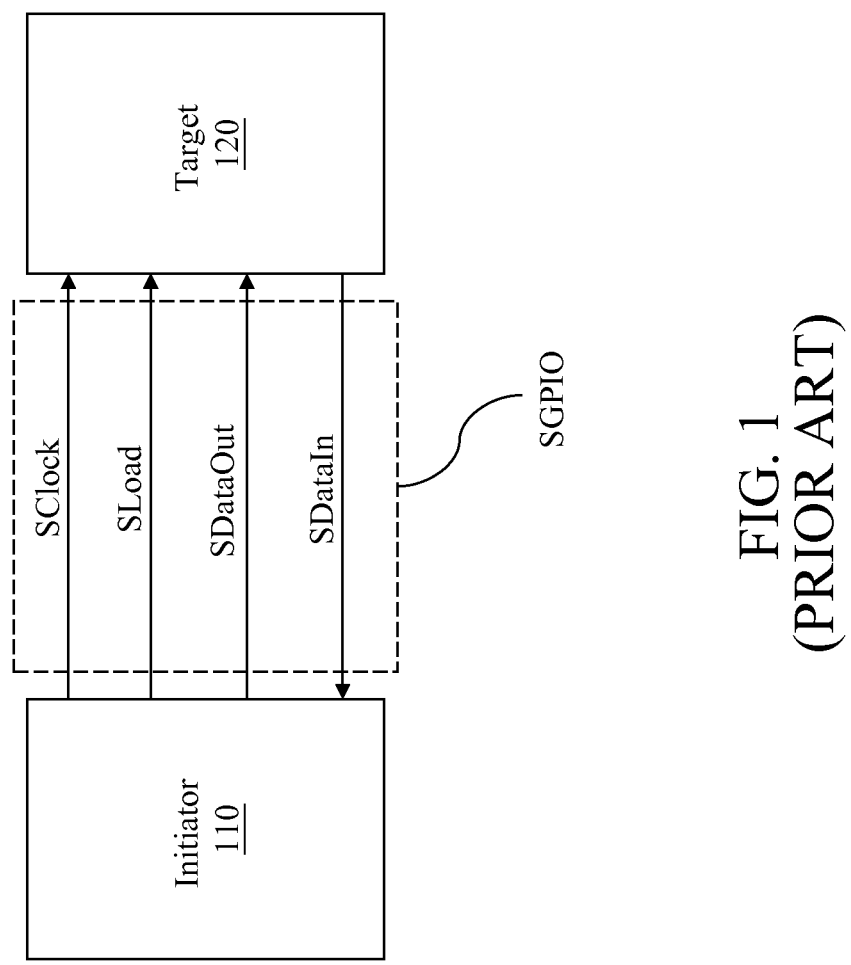
FIG. 1 is a schematic view of pins of SGPIO in the conventional art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
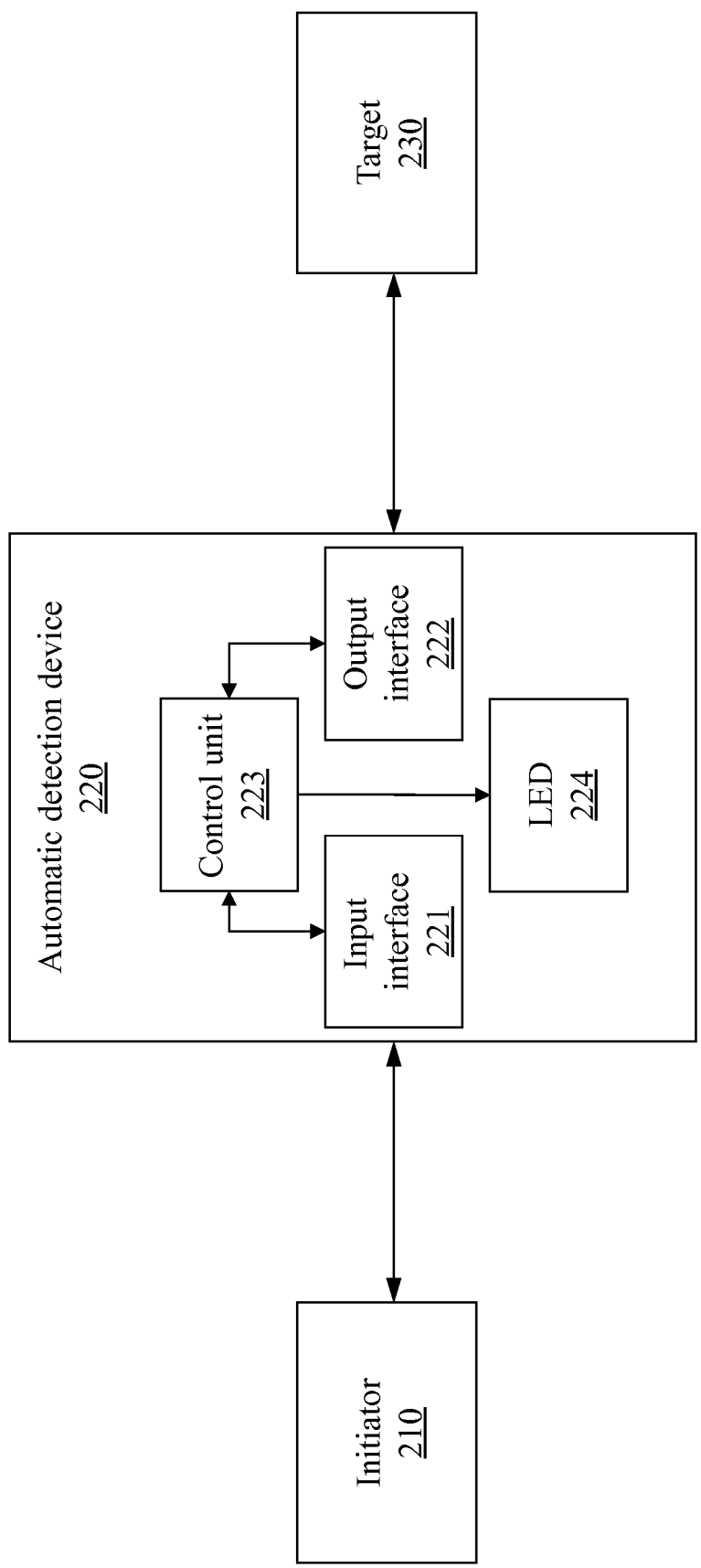
FIG. 2 is a schematic view of architecture of the disclosure.

FIG. 2 is a schematic view of the architecture of one embodiment of the invention.

An automatic serial signal detecting and transceiving device 220 is electrically connected between an initiator 210 and a target 230. The initiator 210 is a motherboard or a host bus adapter (HBA) of a computer device, and the target 230 may be, but is not limited to, a backplane or another peripheral device with a supporting interface protocol. In one embodiment, the automatic serial signal detecting and transceiving device 220 is physically separate from the target 230. In another embodiment, the automatic serial signal detecting and transceiving device 220 is integrated in the target 230. The initiator 210 communicates using either the SGPIO interface protocol, the I²C interface protocol, or both.

The automatic serial signal detecting and transceiving device 220 comprises an input interface 221, an output interface 222, a control unit 223, and a set of one or more light-emitting diodes (LEDs) 224. The input interface 221 is electrically connected via a four signal line bus to the initiator 210. The input interface 221 comprises a load pin, a CLK pin, a DataOut pin and a DataIn pin.

The CLK pin connects to and serves either the SCLK signal line, or the serial clock line (SCL), of the initiator 210, depending on whether the initiator 210 is communicating via the SGPIO protocol or the I²C protocol. The DataOut pin connects to and serves either the SDataOut signal line (SDataOut), or the serial data line (SDA) of the initiator 210, again depending on whether the initiator 210 is communicating via the SGPIO protocol or the I²C protocol. The load pin connects to and serves either the SLoad signal line, or the Reset signal line, of the initiator 210, again depending on whether the initiator 210 is communicating via the SGPIO protocol or the I²C protocol. Finally, the DataIn pin connects to and serves the SDataIn signal line of the initiator 210, assuming the initiator 210 is communicating via the SGPIO protocol. Again, three of the four signal pins of the input interface 221 have dual operability, serving either the SGPIO interface protocol or the interface protocol, depending on the protocol being used by the initiator 210. Referring to Table 2, a correspondence table of pins of SGPIO and I²C of the disclosure is listed.

TABLE 2

Correspondence Table of Pins of SGPIO and I²C of the disclosure

| PIN FUNCTION OF SGPIO | PIN FUNCTION OF I²C |
| --- | --- |
| SCLK | Clock (2W_SCLK) |
| SDataOut | DataOutput (2W_SDA) |
| SLoad | Reset (Reset) |
| SDataIn | |

Notably, in Table 2, the load pin and DataOut pins serve different combinations of SGPIO and I²C signal lines than the combinations shown in Table 1. Significantly, the load pin corresponds to either the SLoad signal line of an SGPIO bus, or the Reset signal line of an I²C bus. Therefore, the present embodiment detects different interface protocols without the need to connect yet other signal lines.

Figure 3:
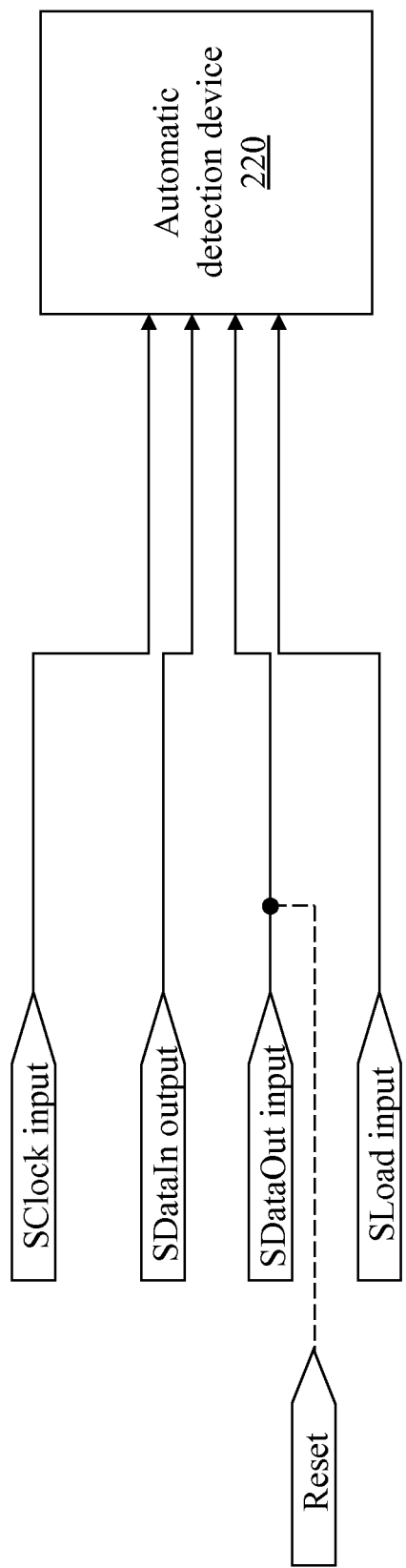
FIG. 3 is a schematic view of signal lines of an input interface of the disclosure.

To further illustrate the pin connections, FIG. 3 presents a schematic view of signal lines of an input interface 221. In FIG. 3, the load pin, the CLK, the DataOut and the DataIn pins of the input interface 221 are respectively connected to the CLK, SDataOut, SDataIn, and SLoad signal lines (indicated by black solid lines) of the SGPIO bus. To distinguish the SGPIO bus from the I²C bus, the Reset line is indicated by a black dashed line besides the SLoad line. Physically, SLoad and Reset share one signal line.

The control unit 223 is electrically connected to a set of one or more LEDs 224, an input interface 221, and an output interface 222. The control unit 223 detects the interface protocol being used by the initiator 210 according to the signals sent by the initiator 210 to the load pin. The control unit 223 transfers the data sent by the initiator 210 to the target 230 through the output interface 222 according to the detected interface protocol. The control unit 223 controls a light-emitting frequency and/or blinking frequency of the LED 224 according to the interface protocol and the data signal.

Figure 4:
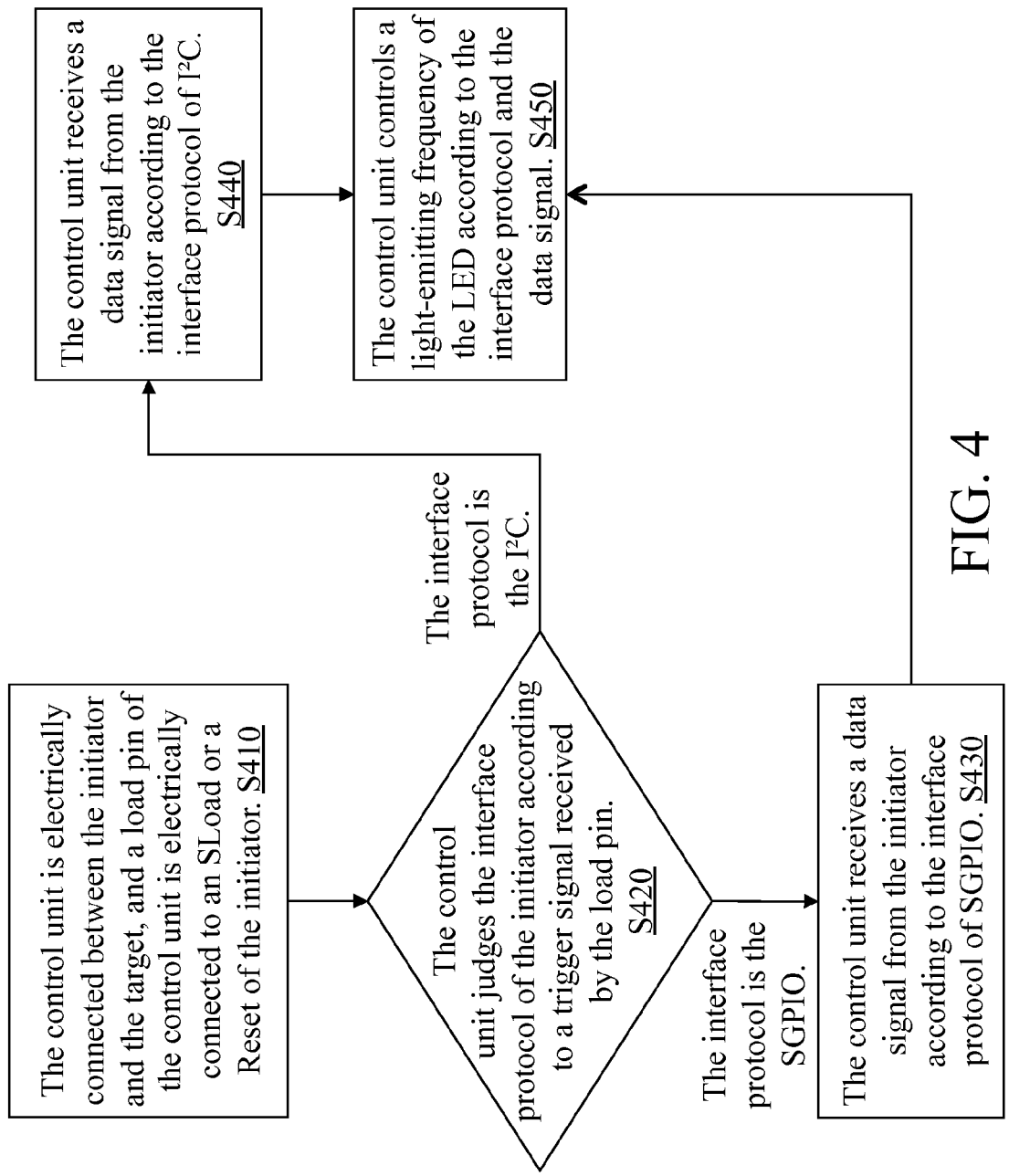
FIG. 4 is a schematic view of an operation flow of the disclosure.

The operation flow of the disclosure is further explained here, and reference is made to FIG. 4. FIG. 4 is a schematic view of an operation flow of the disclosure, in which the automatic detection method of the disclosure comprises the following steps.

Step S410: The control unit is electrically connected between the initiator and the target, and a load pin of the control unit is electrically connected to an SLoad or a Reset signal line of the initiator.

Step S420: The control unit detects the interface protocol being used by the initiator according to a trigger signal received through the load pin.

Step S430: If the interface protocol is the SGPIO, the control unit receives a data signal from the initiator according to the SGPIO interface protocol.

Step S440: If the interface protocol is the I²C, the control unit receives a data signal from the initiator according to the I²C interface protocol.

Step S450: The control unit controls a blinking and/or light-emitting frequency of the LED according to the detected interface protocol and the data transmitted in accordance with the detected interface protocol.

First, the control unit 223 is electrically connected between the initiator 210 and the target 230. The control unit 223 detects the interface protocol used by the initiator 210 according to a trigger signal received through the load pin. If communicating via the SGPIO interface protocol, the initiator 210 sends an SLoad signal before transferring the data frame, to inform the target 230 to get ready to receive the relevant data signal. If communicating via the I²C interface protocol, the initiator 210's Reset signal line is connected to the load pin of the input interface 221. The I²C does not have an SLoad signal, so the control unit 223 detects the difference between the SGPIO and the I²C interface protocol based on an evaluation of the signals received through the load pin.

If the interface protocol is the SGPIO, the control unit 223 receives a data signal from the initiator 210 according to the interface protocol of the SGPIO. If the interface protocol is the I²C, the control unit 223 receives a data signal from the initiator 210 according to the interface protocol of the I²C. Then, the control unit 223 controls a blinking and/or light-emitting frequency of the LED 224 according to the detected interface protocol and the data signal. Generally speaking, after the target 230 is connected to the initiator 210, the LED 224 of the automatic detection device 220 emits a connection light signal. When the automatic detection device 220 transfers data, the control unit 223 controls the LED 224 to blink at a corresponding frequency. In addition to the LED 224, the LED 224 of the disclosure may also be replaced by a 7-segment display or another display device.

Finally, after the control unit 223 finishes the data transfer of the interface protocol of SGPIO, the control unit 223 maintains the interface protocol set by the input interface 221. Also, immediately after completion of a data transfer using the SGPIO interface protocol, the control unit 223 monitors the load pin for trigger signals to again detect which of the I²C and SGPIO interface protocols a connected initiator 210 is using.

In the detection device for the I²C and the SGPIO according to the disclosure, the automatic switching to a corresponding transfer protocol is realized when testing different motherboards on production lines, thereby accelerating the relevant test of the data transfer of the target 230.

It will be apparent to those skilled in the art that various modifications and variations can be made to the disclosed embodiments. It is intended that the specification and examples be considered as exemplary only, with a true scope of the disclosure being indicated by the following claims and their equivalents

What is claimed is:

1. An automatic serial signal detecting and transceiving device operable to be interfaced with inter-integrated circuit (I²C) and serial general purpose input/output (SGPIO) busses, and operable to automatically detect whether a connected initiator unit is using an I²C interface protocol or an SGPIO interface protocol, the automatic detection device comprising:

an input interface configured for electrical connection to the initiator unit, the input interface comprising a load pin that is configured to be electrically connected to an SLoad signal line of an SGPIO bus, which load pin is also configured to be electrically connected to a Reset signal line of an I²C bus; and a control unit, electrically connected to the input interface, configured to detect which of the I²C and SGPIO interface protocols a connected initiator unit is using according to a trigger signal received by the load pin, and further configured to transceive a data signal of the initiator unit according to the detected interface protocol, wherein the control unit is configured, upon completion of a data transfer using the SGPIO interface protocol, to again detect which of the I²C and SGPIO interface protocols a connected initiator unit is using.

2. The automatic serial signal detecting and transceiving device according to claim 1, wherein the input interface comprises four sequentially arranged pins, including a DataOut pin that is configured to be electrically connected to an SDataOut signal line of an SGPIO bus, and which DataOut pin is also configured to be electrically connected to an SDA signal line of an I²C bus, and wherein the control unit is configured to process signals received on the DataOut pin as SDataOut signals or as SDA signals, depending on the detected interface protocol.

3. The automatic serial signal detecting and transceiving device according to claim 1, wherein the input interface further comprises a CLK pin, a DataOutput pin, and a DataIn pin, wherein the CLK pin is configured to be connected to an SCLK of the initiator, the DataOutput pin is configured to be connected to an SDataOut of the initiator, and the DataIn pin is configured to be connected to an SDataIn of the initiator.

4. The automatic serial signal detecting and transceiving device according to claim 1, further comprising a set of one or more light-emitting diodes (LEDs), wherein the control unit controls a frequency of the one or more LEDs according to the detected interface protocol and data transmitted in accordance with the detected interface protocol.

5. The automatic serial signal detecting and transceiving device according to claim 1, further comprising an output interface, electrically connected to the control unit, and operable to be electrically connected to a target device.

6. The automatic serial signal detecting and transceiving device according to claim 1, wherein the automatic serial signal detecting and transceiving device is integrated into a target device.

7. A method for using a common physical serial data interface to connect to inter-integrated circuit (I$^2$C) and serial general purpose input/output (SGPIO) busses, the method comprising:

electrically connecting an automatic serial signal detecting and transceiving device between an initiator unit and a target unit using an I$^2$C or SGPIO bus, wherein a load pin of the automatic serial signal detecting and transceiving device is electrically connected to an SLoad signal line, if the target unit is using an SGPIO bus, or to a Reset signal line, if the target is using an I$^2$C bus;

detecting, by the automatic serial signal detecting and transceiving device, the interface protocol of the initiator unit according to a trigger signal received by the load pin;

transceiving a data signal of the initiator according to the detected interface protocol; and monitoring the load pin for trigger signals immediately after completion of a data transfer using the SGPIO interface protocol, to again detect which of the I$^2$C and SGPIO interface protocols a connected initiator unit is using.

8. The method according to claim 7, wherein the automatic serial signal detecting and transceiving device has an input interface comprising:

four sequentially arranged pins, including a DataOut pin that is configured to be electrically connected to an SDataOut signal line of an SGPIO bus, and which DataOut pin is also configured to be electrically connected to an SDA signal line of an I$^2$C bus, and a control unit configured to process signals received on the DataOut pin as SDataOut signals or as SDA signals, depending on the detected interface protocol.

9. The method according to claim 7, wherein the automatic serial signal detecting and transceiving device has an input interface comprising:

a CLK pin configured to be connected to an SCLK of the initiator unit;

a DataOutput pin configured to be connected to an SDataOut of the initiator unit; and a DataIn pin configured to be connected to an SDataIn of the initiator unit.

10. The method according to claim 7, further comprising controlling a frequency of a light-emitting diode (LED) according to the detected interface protocol and data transferred in accordance with the detected interface protocol.

11. The method of claim 9, wherein the frequency is the light-emitting frequency of the LED.

12. The method of claim 9, wherein the frequency is the blinking frequency of the LED.

13. A system for automatically detecting which of an internal integrated circuit (I$^2$C) and a serial general purpose input/output (SGPIO) interface protocol with which a connected device is communicating, the system comprising:

an initiator unit, configured to send a data signal in accordance with either the I$^2$C or the SGPIO interface protocol;

a target unit, configured to receive the data signal; and an automatic serial signal detecting and transceiving device, electrically connected between the initiator unit and the target unit, the automatic serial signal detecting and transceiving device comprising:

an input interface electrically via an I$^2$C or SGPIO bus to the initiator unit, including a load pin that connects to either an SLoad signal line of the bus, if the bus is an SGPIO bus, or a Reset signal line of the bus, if the bus is an I$^2$C bus; and a control unit configured to detect which of the I$^2$C and SGPIO interface protocols the initiator unit is using according to a trigger signal received by the load pin, and further configured to transceive the data signal of the initiator according to the detected interface protocol, wherein the control unit is configured, upon completion of a data transfer using the SGPIO interface protocol, to again detect which of the I$^2$C and SGPIO interface protocols the connected initiator unit is using.

14. The system according to claim 13, wherein the input interface comprises four sequentially arranged pins, including a DataOut pin that is connected to either an SDataOut signal line of the bus, if the bus is an SGPIO bus, or an SDA signal line of the bus, if the bus is an I$^2$C bus, and wherein the control unit is configured to process signals received on the DataOut pin as SDataOut signals or as SDA signals, depending on the detected interface protocol.

15. The system according to claim 13, wherein the input interface further comprises a CLK pin, a DataOutput pin, and a DataIn pin, wherein the CLK pin is configured to be connected to an SCLK signal line of the bus, the DataOutput pin is configured to be connected to an SDataOut signal line of the bus, and the DataIn pin is configured to be connected to an SDataIn of the bus, if the bus is an SGPIO bus.

16. The system according to claim 13, wherein the automatic detection device controls a frequency of the light-emitting diode (LED) according to the detected interface protocol and data transferred in accordance with the detected interface protocol.

17. The system according to claim 13, wherein the automatic serial signal detecting and transceiving device is integrated into the target unit.

* * * * *